United States Patent
Hirokane et al.

(10) Patent No.: US 6,178,143 B1
(45) Date of Patent: Jan. 23, 2001

(54) MAGNETO-OPTICAL RECORDING MEDIUM FOR ACHIEVING SUPER RESOLUTION REPRODUCTION OF HIGH RESOLUTION RECORDED INFORMATION

(75) Inventors: Junji Hirokane, Nara; Yoshiteru Murakami, Nishinomiya; Akira Takahashi, Nara, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/258,180

(22) Filed: Feb. 25, 1999

Related U.S. Application Data

(62) Division of application No. 08/892,922, filed on Jul. 15, 1997, now Pat. No. 5,926,444.

(30) Foreign Application Priority Data

Jul. 23, 1996 (JP) .................................................. 8-193140

(51) Int. Cl.[7] .................................................. G11B 11/00
(52) U.S. Cl. .................................. 369/13; 428/694 MM
(58) Field of Search .............................. 369/13, 14, 288, 369/284, 275.2, 275.1, 286, 283, 110, 112, 116; 428/694 MM, 694 EC, 694 SC; 365/122

(56) References Cited

U.S. PATENT DOCUMENTS

| 5,278,810 | 1/1994 | Takahashi et al. . |
| 5,428,585 | 6/1995 | Hirokane et al. . |
| 5,493,545 | 2/1996 | Matsumoto . |
| 5,623,458 | 4/1997 | Matsumoto et al. . |
| 5,926,444 | * 7/1999 | Hirokane et al. ...................... 369/13 |

FOREIGN PATENT DOCUMENTS

| 195 06 374 A1 | 9/1995 | (DE) . |
| 195 36 796 A1 | 4/1996 | (DE) . |
| 0 586 175 A1 | 3/1994 | (EP) . |
| 0 596 716 A2 | 5/1994 | (EP) . |
| 0 673 026 A2 | 9/1995 | (EP) . |
| 0 810 594 A2 | 3/1997 | (EP) . |

OTHER PUBLICATIONS

U.S. application No. 08/147,373, filed Nov. 3, 1993, pending application.

Copy of Communication dated Jun. 17, 1998, issued by the European Patent Office re corresponding EPA No. 97305512.2–.

(List continued on next page.)

* cited by examiner

Primary Examiner—Ali Neyzari
(74) Attorney, Agent, or Firm—Dike, Bronstein, Roberts & Cushman, LLP; David G. Conlin; William J. Daley, Jr.

(57) ABSTRACT

A magneto-optical recording medium has a recording layer made of a perpendicular magnetization film, and a readout layer which is in an in-plane magnetization state at room temperature and changes into a perpendicular magnetization state with a rise in temperature. When the magneto-optical recording medium is irradiated with a light beam, the readout layer separates into three regions: a region in an in-plane magnetization state, a region in a perpendicular magnetization state, and a region having a temperature not lower than the Curie temperature thereof. Only the region in the perpendicular magnetization state allows copying of the magnetization of the recording layer. Therefore, even when the diameter and intervals of recording bits on the recording layer are very small, it is possible to reproduce a target recording bit separately from a recording bit adjacent to the target recording bit.

20 Claims, 9 Drawing Sheets

OTHER PUBLICATIONS

S. Yoshimura, et al. "Large–Capacity Magneto–Optical Disk System Using Magnetically Induced Super Resolution", IEEE Transactions on Consumer Electronics, vol. 38, No. 3, Aug. 1, 1992, pp. 660–664, XP000311908.

M. Kaneko, et al. "Multilayered Magneto–Optical Disks For Magnetically Induced Superresolution", Japanese Journal of Applied Physics, vol. 31, No. 2B, Feb. 1, 1992, pp. 568–575, XP000323484.

K. Tamanoi, et al., *Magnetically—Induced Super Resolution Using Magneto–Static Coupling*, Magneto–Optical Recording International Symposium, Sep. 27–29, 1994, Tokyo, Japan, p. 126.

N. Nishimura, et al. "Magnetostatic Coupling MSR With In–Plane Magnetization Films", Japanese Journal of Applied Physics, vol. 35, No. 1B, Jan. 1996, Tokyo JP, pp. 403–409, XP002066758.

MOVING DIRECTION OF DISK →

↑ DIRECTION OF SUB-LATTICE MOMENT OF TRANSITION METAL

⇑ LEAKAGE MAGNETIC FIELD

MOVING DIRECTION OF DISK →

↑ DIRECTION OF SUB-LATTICE MOMENT
  OF TRANSITION METAL

⇑ LEAKAGE MAGNETIC FIELD

↑ DIRECTION OF SUB-LATTICE MOMENT OF TRANSITION METAL

⇑ LEAKAGE MAGNETIC FIELD

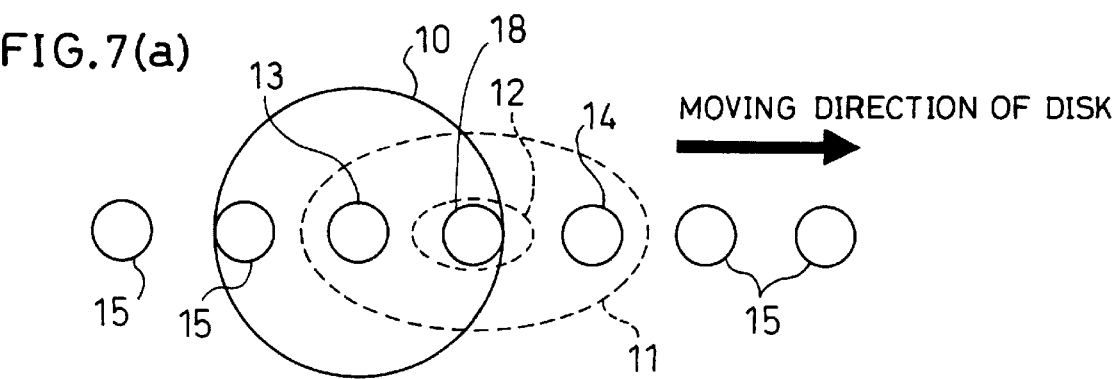
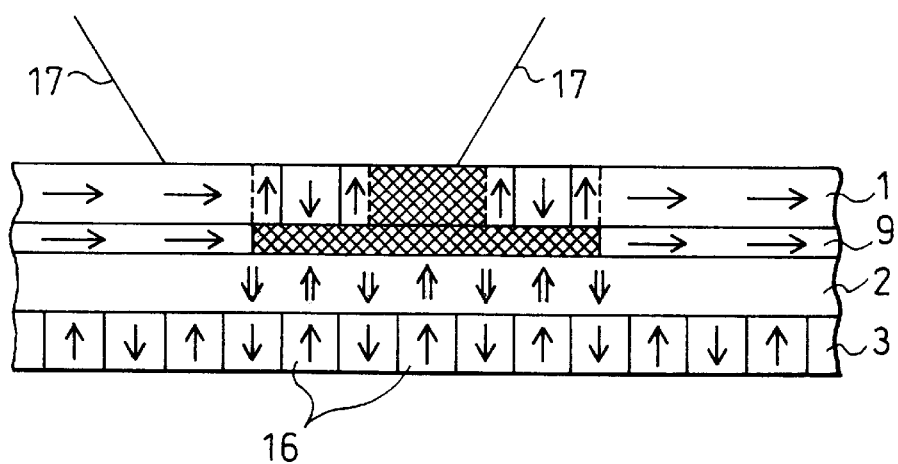
↑ DIRECTION OF SUB-LATTICE MOMENT
OF TRANSITION METAL
⇑ LEAKAGE MAGNETIC FIELD

MAGNETO-OPTICAL RECORDING MEDIUM FOR ACHIEVING SUPER RESOLUTION REPRODUCTION OF HIGH RESOLUTION RECORDED INFORMATION

This application is a divisional of U.S. application Ser. No. 08/892,922, filed Jul. 15, 1997, now U.S. Pat. No. 5,926,444, the teachings of which are incorporated herein by reference.

FIELD OF THE INVENTION

The present invention relates to magneto-optical recording media, such as magneto-optical disks, magneto-optical tapes, and magneto-optical cards, for use in a magneto-optical recording and reproducing apparatus, and a method of reproducing information on such a magneto-optical recording medium.

BACKGROUND OF THE INVENTION

Magneto-optical recording media have been in practical use as rewritable magneto-optical recording media. Information is recorded on and reproduced from the magneto-optical recording medium with the use of a light beam which is emitted by a semiconductor laser and converged on the magneto-optical recording medium. A problem with such conventional magneto-optical recording media is that their reproduction characteristics deteriorate when recording bits serving as magnetic recording domains have too small diameter and intervals, in comparison with the diameter of the light beam.

The cause of such a problem is that the light beam converged on a target recording bit covers within its diameter not only the target recording bit, but also a neighboring recording bit, and that each recording bit therefore cannot be reproduced independently.

Japanese Laid-Open Patent Application No. 150418/1994 (Tokukaihei 6-150418) discloses a magneto-optical recording medium capable of solving the above-mentioned problem. The magneto-optical recording medium is constructed to have a non-magnetic intermediate layer between a recording layer and a readout layer. The readout layer is in an in-plane magnetization state at room temperature, and changes into a perpendicular magnetization state with a rise in temperature. In this structure, magnetostatic coupling is achieved between the recording layer and readout layer through the non-magnetic intermediate layer therebetween. In a portion of the readout layer which is in the perpendicular magnetization state, the magnetization of the recording layer is copied. On the other hand, a portion of the readout layer, which exhibits the in-plane magnetization state, masks the magnetization of the recording layer. This structure does not allow reproduction of information of a recording bit in a portion of the recording layer, which is adjacent to the portion of the readout layer exhibiting the in-plane magnetization state. It is therefore possible to reproduce each recording bit independently even if the converged light beam covers the target recording bit to be reproduced and a neighboring recording bit within its diameter.

However, it has been confirmed that the magneto-optical recording medium disclosed in the above-mentioned document has a problem in reproducing information which is recorded with a smaller recording bit diameter at smaller recording bit intervals. Namely, sufficient masking cannot be achieved by the in-plane magnetization, and sufficient reproduced signals are not obtained.

SUMMARY OF THE INVENTION

An object of the present invention is to provide a magneto-optical recording medium capable of offering reproduced signals of information recorded with a so small recording bit diameter at so small recording bit intervals as not to be reproducible from a conventional super-resolution magneto-optical recording medium, and provide a reproduction method.

In order to accomplish the object, a magneto-optical recording medium of the present invention has:

a recording layer made of a perpendicular magnetization film; and a readout layer made of a magnetic film that is in an in-plane magnetization state at room temperature and changes into a perpendicular magnetization state from the critical temperature to the Curie temperature thereof, wherein a portion of the readout layer, which is in the perpendicular magnetization state, is magnetically coupled with the recording layer and copies the magnetization of the recording layer, and a portion in the in-plane magnetization state and a portion having a temperature not lower than the Curie temperature do not copy the magnetization of the recording layer.

In this magneto-optical recording medium, the critical temperature is a phase transition temperature at which the readout layer changes from the in-plane magnetization state to the perpendicular magnetization state. When the magneto-optical recording medium is irradiated with a light beam, three different temperature regions are formed in the readout layer. These temperature regions include a first-temperature region which is not exposed to the light beam and does not show a rise in temperature, a second-temperature region whose temperature is not lower than the critical temperature but is not higher than the Curie temperature of the readout layer, and a third-temperature region whose temperature is not lower than the Curie temperature.

In the first-temperature region, since the readout layer is in the in-plane magnetization state, the magnetization of the recording layer which is in the perpendicular magnetization state is not copied. In addition, in the third-temperature region, since the readout layer has a temperature not lower than the Curie temperature, the magnetization of the recording layer is not copied. Therefore, among the three different temperature regions of the readout layer, only the second-temperature region can copy the magnetization of the recording layer. It is thus possible to extremely narrow a region which copies the magnetization of the recording layer and is covered within the spot of the light beam. Consequently, even when the recording bit diameter and the recording bit intervals on the recording layer are very small, a target recording bit can be reproduced separately from a recording bit adjacent to the target recording bit, thereby achieving magnetic super-resolution reproduction of higher resolution.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) is an explanatory view for explaining the temperature distribution of a readout layer of a magneto-optical recording medium of Embodiment 2 when a light beam is applied to the magneto-optical recording medium, and FIG. 7(b) is an explanatory view for explaining a schematic structure of the medium and the magnetizations of the readout layer, an in-plane magnetization layer and a recording layer during reproduction.

DESCRIPTION OF THE PREFERRED EMBODIMENTS

[Embodiment 1]

Figure 1A:
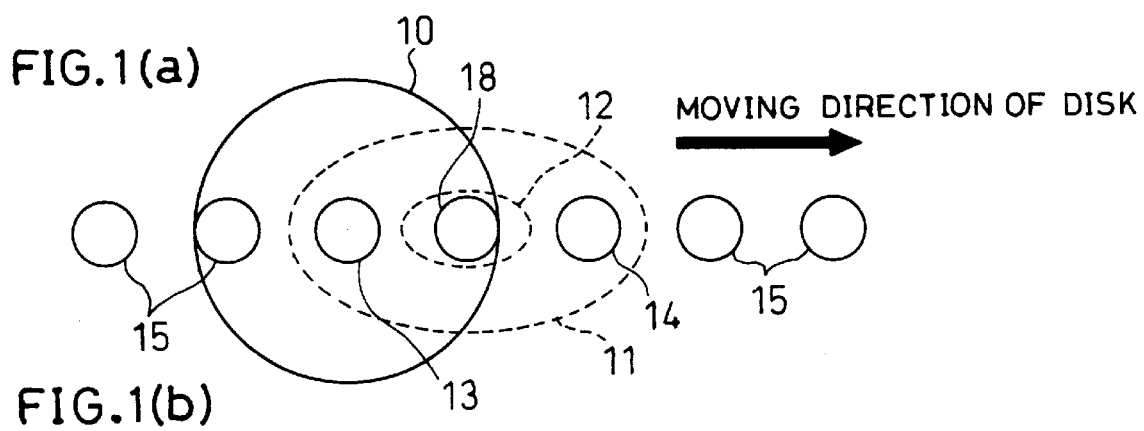
FIG. 1(a) is an explanatory view for explaining the temperature distribution of a readout layer of a magneto-optical recording medium of Embodiment 1 when a light beam is applied to the magneto-optical recording medium.

Referring to the drawings, the following description will explain Embodiment 1 of the present invention in detail.

First, in order to explain the principle of a reproducing operation with a magneto-optical recording medium, a conventional magnetic super-resolution reproducing operation will be explained as a comparative example.

Figure 2A:
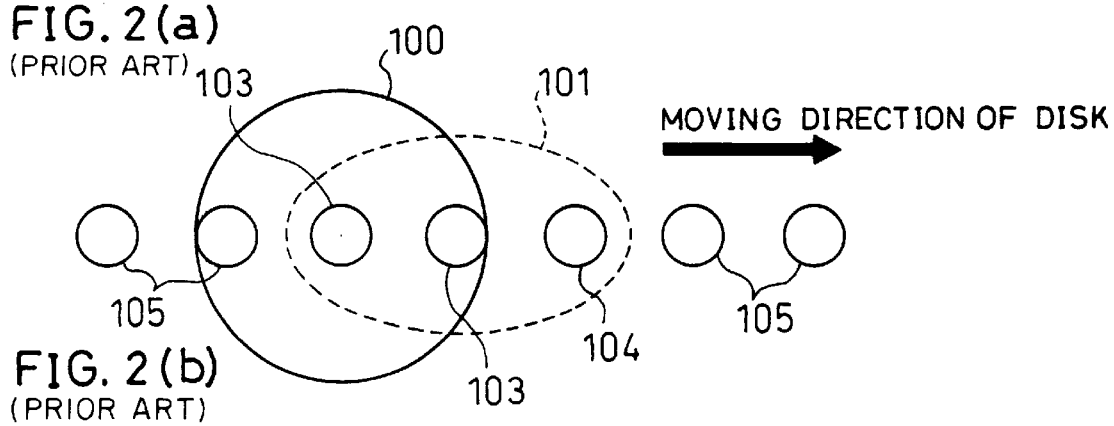
FIG. 2(a) is an explanatory view for explaining the temperature distribution of a readout layer of a conventional super-resolution magneto-optical recording medium when a light beam is applied to the magneto-optical recording medium.
Figure 2B:
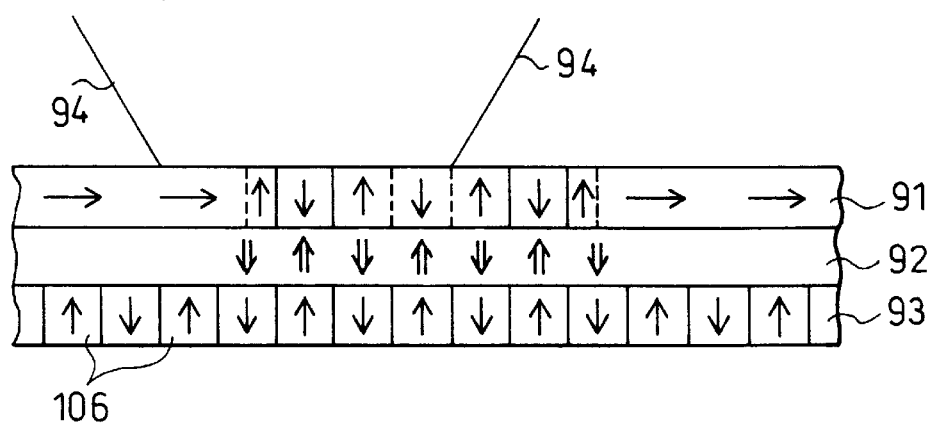
FIG. 2(b) is an explanatory view for explaining a schematic structure of the medium and the magnetizations of the readout layer and a recording layer during reproduction.

FIGS. 2(a) and 2(b) are explanatory views for explaining the reproduction state of a conventional super-resolution magneto-optical recording medium (hereinafter just referred to as the conventional medium). FIG. 2(b) explains a schematic structure of the conventional medium, and the magnetizations of layers 91 and 93 of the conventional medium in a reproduction state. As illustrated in FIG. 2(b), the conventional medium includes the readout layer 91, a non-magnetic intermediate layer 92, and the recording layer 93. The readout layer 91 is made of an alloy of rare-earth metal and transition metal. The readout layer 91 is in an in-plane magnetization state at room temperature, and changes into a perpendicular magnetization state with a rise in temperature.

The recording layer 93 is made of an alloy of rare-earth metal and transition metal. This alloy has a compensation temperature at room temperature. Recording bits 106 are formed on the recording layer 93. In FIG. 2(b), the recording bits 106 are the portions having upward magnetization. In the recording layer 93, the portions having downward magnetization show an initialized state, and are not the recording bits. It is said for all of the magneto-optical recording media to be described later that portions having upward magnetization in the recording layer are the recording bits, and portions having downward magnetization are not the recording bits.

Additionally, formed on the readout layer 91 are magnetic domains corresponding to the recording bits 106 on the recording layer 93. A leakage magnetic field from the recording layer 93 enters into the non-magnetic intermediate layer 92. The leakage magnetic field achieves magnetostatic coupling between the layers 91 and 93 through the non-magnetic intermediate layer 92 therebetween.

A light beam 94 is converged on this conventional medium from the readout layer 91 side so as to reproduce information. A temperature distribution like the Gaussian temperature distribution, corresponding to the intensity distribution of the light beam 94, is formed on the conventional medium with the application of the light beam 94. FIG. 2(a) is an explanatory view for explaining the temperature distribution on the readout layer 91 irradiated with the light beam 94. As shown in FIG. 2(a), a temperature distribution indicated by an isotherm 101 is formed on the conventional medium with the application of the light beam 94. The portion inside the isotherm 101 is a high-temperature region. In the following description, the portion outside the isotherm 101 is referred to as a first-temperature region, while the portion inside thereof is called a second-temperature region. The second-temperature region of the readout layer 91 is in a perpendicular magnetization state, and the magnetization of the recording bits 106 on the recording layer 93 is copied thereto. Among the magnetic domains formed on the readout layer 91, magnetic domains 103 and 104 are the magnetic domains in the second-temperature region. On the other hand, the first-temperature region of the readout layer 91 is a low-temperature region, and in an in-plane magnetization state. The first-temperature region functions as a mask which prevents copying of the recording bits 106 on the recording layer 93. Magnetic domains 105 shown in FIG. 2(a) indicate the magnetic domains in the first-temperature region of the readout layer 91. In a reproducing operation, the conventional medium is being moved, and thus the high-temperature region comes out of a beam spot 100 of the light beam 94. Although the magnetic domain 104 is the magnetic domain in the second-temperature region of the readout layer 91, the magnetic domain 104 is not involved in the reproducing operation because it comes out of the beam spot 100.

In the conventional medium having the above-mentioned temperature distribution, the first-temperature region of the readout layer 91 functions as a mask for masking the magnetization of the recording bits 106 on the recording layer 93. Moreover, in the high-temperature region, the total magnetization of the readout layer 91 is oriented in the direction of a leakage magnetic field generated from the recording layer 93. As a result, only the perpendicular magnetization components in the second-temperature region of the readout layer 91 are reproduced as information, thereby achieving a super-resolution reproducing operation.

However, in the conventional medium, when the recording bits 106 are formed at such a high density as that shown in FIG. 2(b), a plurality of reproducible magnetic domains 103 (two reproducible magnetic domains in FIG. 2(a)) are present in the second-temperature region of the readout layer 91. In this case, it is difficult to obtain a reproduced signal with good reproduction characteristics from the conventional medium.

The readout layer 91 is required to contain a greater amount of rare-earth metal sub-lattice moments compared to a compensation composition in which the magnitude of the rare-earth metal sub-lattice moments is equal to the magnitude of the transition metal sub-lattice moments. This requirement must be satisfied in order to achieve the readout layer 91 having such characteristics that the readout layer 91 is in the in-plane magnetization state at room temperature and changes into the perpendicular magnetization state with an increase in temperature. By satisfying this requirement, the transition metal sub-lattice moments of the readout layer 91 are aligned in a direction antiparallel to the direction of the total magnetization.

On the other hand, in the recording layer 93, a rare-earth and transition metal alloy having its compensation temperature at room temperature is used. Thus, the magnitude of the transition metal sub-lattice moments becomes greater than that of the rare-earth metal sub-lattice moments with increasing temperature. Consequently, the direction of the transition metal sub-lattice moments of the recording layer 93 becomes parallel to the direction of the total magnetization. As a result, in a portion where the readout layer 91 copies the magnetization of the recording layer 93, the transition metal sub-lattice moments of the readout layer 91 are aligned in a direction antiparallel to the leakage magnetic field from the recording layer 93.

Figure 1B:
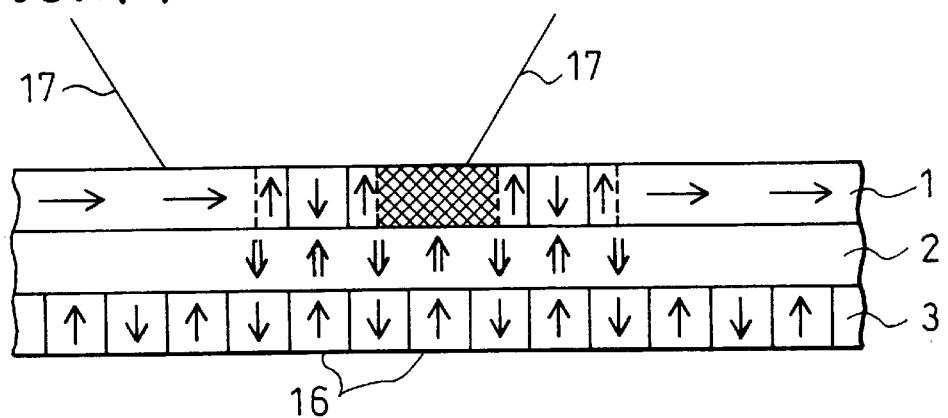
FIG. 1(b) is an explanatory view for explaining a schematic structure of the medium and the magnetizations of the readout layer and a recording layer during reproduction.

Next, the following description will explain the principle of a reproducing operation with a super-resolution magneto-optical recording medium (hereinafter just referred to as the magneto-optical recording medium) of this embodiment. FIGS. 1(a) and 1(b) are explanatory views for explaining the reproduction state of the magneto-optical recording medium of this embodiment. FIG. 1(b) explains a schematic structure of the magneto-optical recording medium of this embodiment, and the magnetizations of the layers 1 and 3 in a reproduction state. As shown in FIG. 1(b), the magneto-optical recording medium of this embodiment includes the readout layer 1, a non-magnetic intermediate layer 2, and the recording layer 3. The non-magnetic intermediate layer 2 and the recording layer 3 have the same structures as those of the above-mentioned non-magnetic intermediate layer 92 and recording layer 93, and the recording layer 3 has recording bits 16. The non-magnetic intermediate layer 2 is provided so as to completely break the exchange coupling between the readout layer 1 and the recording layer 3, and achieve good magnetostatic coupling between the readout layer 1 and the recording layer 3.

The readout layer 1 is in an in-plane magnetization state at room temperature, and changes into perpendicular magnetization state when heated to temperatures not lower than a critical temperature. The critical temperature is a temperature which is between room temperature and the Curie temperature of the readout layer 1, and determined by the composition of the readout layer 1. The Curie temperature of the readout layer 1 is set lower than that of the readout layer 91 of the conventional medium.

FIG. 1(a) is an explanatory view for explaining the temperature distribution on the readout layer 1 irradiated with a light beam 17. As shown in FIG. 1(a), when the light beam 17 is applied to the magneto-optical recording medium of this embodiment from the readout layer 1 side, a Gaussian temperature distribution is formed like the conventional medium, and a temperature distribution indicated by an isotherm 11 is formed. Like the above, the portion inside the isotherm 11 showing perpendicular magnetization is called the second-temperature region, and the portion outside thereof having in-plane magnetization is referred to as the first-temperature region. As described above, the first-temperature region functions as a mask which prevents transfer copying of the magnetization of the recording bits 16 on the recording layer 3. Magnetic domains 15 are the magnetic domains in the first-temperature region.

In the magneto-optical recording medium of this embodiment, a third-temperature region (a portion inside an isotherm 12) is newly formed within the second-temperature region. The third-temperature region is a region in which the readout layer 1 has a temperature which is not lower than or is very close to its Curie temperature. In this region, therefore, the magnetization of the readout layer 1 is not present or becomes very small. Consequently, the reproduced signal from a magnetic domain 18 shown in FIG. 1(a) is not present or becomes very small. Thus, the third-temperature region functions as a rear mask which prevents copying of the magnetization of the recording layer 3. As a result, super-resolution reproduction is achieved by a double mask, namely, the front mask produced by the in-plane magnetization in the first-temperature region and the rear mask in the third-temperature region.

In this case, on the readout layer 1, there are two magnetic domains, namely magnetic domains 13 and 14, in the second-temperature region, having perpendicular magnetization, and the magnetization of the recording layer 3 is copied thereto. However, only the magnetic domain 13 within the light beam spot 10 is reproduced.

As described above, in the magneto-optical recording medium of this embodiment, since super-resolution reproduction can be performed by the above-mentioned double mask, it is possible to perform super-resolution reproduction with a magneto-optical recording medium having recording bits recorded with a very small diameter at small intervals.

Figure 3:
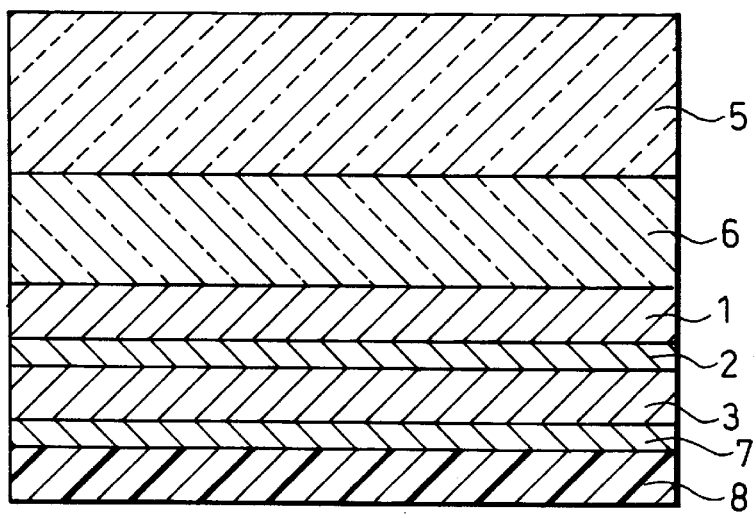
FIG. 3 is a cross sectional view showing the structure of a magneto-optical disk according to Embodiment 1.

The following description will explain a magneto-optical disk as one example of the magneto-optical recording medium of this embodiment. FIG. 3 is a cross sectional view showing the structure of the magneto-optical disk. As illustrated in FIG. 3, the magneto-optical disk includes a transparent dielectric layer 6, a readout layer 1, a non-magnetic intermediate layer 2, a recording layer 3, a protective layer 7 and an overcoat layer 8, arranged in this order on a substrate 5.

A Curie temperature recording method is employed as a recording method for the magneto-optical disk of this embodiment. In this method, a light beam emitted by a semiconductor laser is converged on the readout layer 1 by an objective lens. Then, information is recorded or reproduced with a magneto-optical effect known as the polar Kerr effect. The polar Kerr effect is a phenomenon where the rotation of the plane of polarization of reflected light is reversed by the magnetization direction perpendicular to the incident surface.

The substrate 5 is made of, for example, a transparent material like polycarbonate and formed in a disk shape. The transparent dielectric layer 6 is preferably made of material containing no oxygen, such as AlN, SiN, and AlSiN. The thickness of the transparent dielectric layer 6 needs to be set so as to realize a good interference effect and increase the Kerr rotation angle for incident laser light. The thickness of the transparent dielectric layer 6 is therefore set to about $\lambda/(4n)$, where $\lambda$ is the wavelength of the laser light during reproduction, and n is the refractive index of the transparent dielectric layer 6. For example, when the wavelength of the laser light is 680 nm, the thickness of the transparent dielectric layer 6 is set to about 40 nm to 100 nm.

The readout layer 1 is a magnetic film of a rare-earth and transition metal alloy. The composition of the readout layer 1 is adjusted so that the readout layer 1 has magnetic characteristics of being in an in-plane magnetization state at room temperature and changing into a perpendicular magnetization state with a rise in temperature. Moreover, the readout layer 1 is arranged so that the readout layer 1 is in the perpendicular magnetization state between substantially 80° C. and 120° C. and that its Curie temperature is set between 150° C. and 250° C.

The non-magnetic intermediate layer 2 is made of either a dielectric material such as AlN, SiN and AlSiN, or a non-magnetic metal alloy such as Al, Ti and Ta. The thickness of the non-magnetic intermediate layer 2 is set within a range of from 1 nm to 80 nm so as to achieve magnetostatic coupling between the readout layer 1 and the recording layer 3.

The recording layer 3 is made of a rare-earth and transition metal alloy. The thickness of the recording layer 3 is set within a range of from 20 nm to 80 nm so as to generate a sufficient leakage magnetic field for the readout layer 1.

The protective layer 7 is made of either a dielectric layer such as AlN, SiN and AlSiN, or a non-magnetic transition metal alloy such as Al, Ti and Ta. The protective layer 7 is provided for the purpose of preventing the oxidation of the rare-earth transition metal alloy used for the readout layer 1 and the recording layer 3. The thickness of protective layer 7 is preferably within a range of from 5 nm and 60 nm.

The overcoat layer 8 is formed either by heating a thermosetting resin applied onto the protective layer 7 by spincoating, or by exposing to an ultraviolet ray an ultraviolet-ray-setting resin applied onto the protective layer 7 by spincoating.

(1) Fabrication Process of the Magneto-Optical Disk

The following description will explain a process for fabricating the magneto-optical disk having the above-mentioned structure. The fabrication process described below is of one example. The magneto-optical disk fabricated by the fabrication process of this example is given as sample #1.

First, a polycarbonate substrate 5 formed in a disk shape with a pregroove and prepits was placed on a substrate holder in a sputtering machine provided with an Al target, a GdFeAl alloy target and a GdDyFeCo alloy target. The inside of the sputtering machine was evacuated to $1\times10^{-6}$ Torr to be filled with a mixed gas of argon and nitrogen. Power was supplied to the Al target under a gas pressure of $4\times10^{-3}$ Torr so as to form an 80-nm-thick transparent dielectric layer 6 made of AlN on the substrate 5.

Next, the inside of the sputtering machine was evacuated again to $1\times10^{-6}$ Torr to be filled with an argon gas. Power was supplied to the GdFeAl alloy target under a gas pressure of $4\times10^{-3}$ Torr so as to form a 25-nm-thick readout layer 1 made of $(Gd_{0.30}Fe_{0.70})_{0.93}Al_{0.07}$ on the transparent dielectric layer 6. The readout layer 1 was in an in-plane magnetization state at room temperature, and changed into a perpendicular magnetization state at temperatures not lower than 120° C. The Curie temperature of the readout layer 1 was 200° C.

Subsequently, the inside of the sputtering machine was filled with a mixed gas of argon and nitrogen. Power was supplied to the Al target under a gas pressure of $4\times10^{-3}$ Torr so as to form a 20-nm-thick non-magnetic intermediate layer 2 made of AlN on the readout layer 1.

Next, the inside of the sputtering machine was evacuated again to $1\times10^{-6}$ Torr to be filled with an argon gas. Power was supplied to the GdDyFeCo alloy target under a gas pressure of $4\times10^{-3}$ Torr so as to form a 40-nm-thick recording layer 3 made of $(Gd_{0.50}Dy_{0.50})_{0.23}(Fe_{0.80}Co_{0.20})_{0.77}$ on the non-magnetic intermediate layer 2. The recording layer 3 exhibited a compensation temperature of 25° C. and a Curie temperature of 275° C.

Next, the inside of the sputtering machine was filled with a mixed gas of argon and nitrogen. Power was supplied to the Al target under a gas pressure of $4\times10^{-3}$ Torr so as to form a 20-nm-thick protective layer 7 of AlN on the recording layer 3.

Finally, an ultraviolet-ray-setting resin was applied onto the protective layer 7 by spincoating, and exposed to an ultraviolet ray to form an overcoat layer 8.

Sample #1 of the magneto-optical disk was fabricated through the above-mentioned process. The thicknesses and compositions of the layers 1 to 8 of sample #1 are not necessarily limited to those mentioned above. However, the following description is made using the above-mentioned thicknesses and compositions unless otherwise particularly specified.

(2) Recording and Reproduction Characteristics

Sample #1 of the magneto-optical disk fabricated in the manner mentioned in (1) was measured to find the dependence of the CNR (carrier to noise ratio) on the mark length. The measurement was performed with an optical pickup using a semiconductor laser having a wavelength of 680 nm. The laser power used for the measurement was 2.5 mW. The results of the measurement are shown in FIG. 4.

Figure 4:
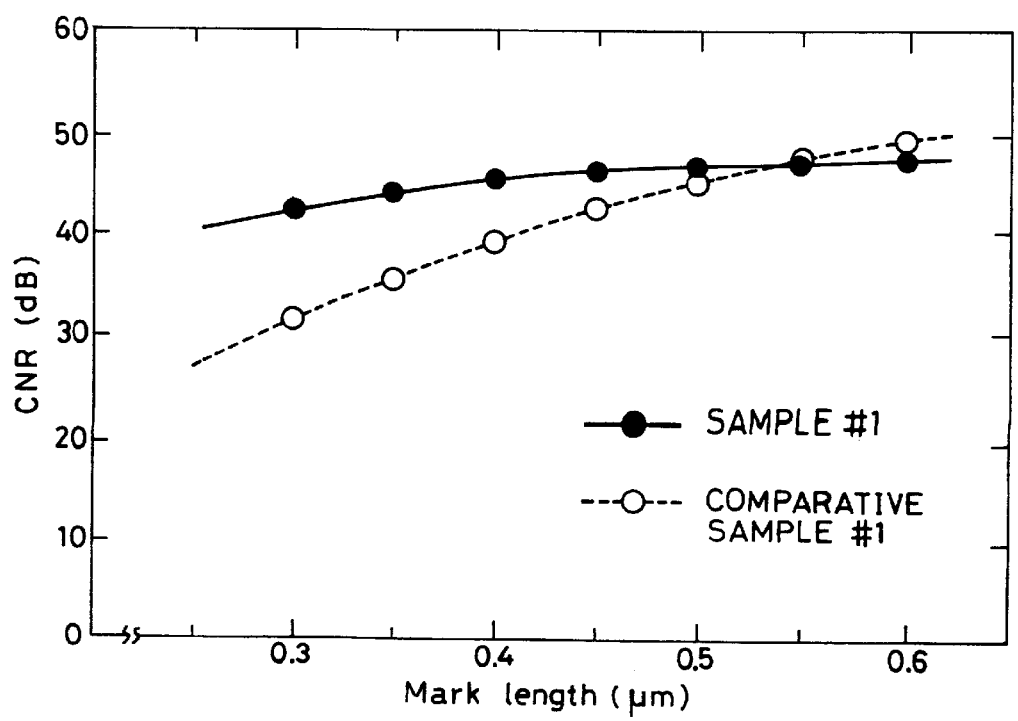
FIG. 4 is a graph showing the results of measuring the dependence of the CNR (carrier to noise ratio) on the mark length of a sample of the magneto-optical disk shown in FIG. 3.

The results of measuring comparative sample #1 is also shown in FIG. 4 for comparison purposes. Comparative sample #1 had the same structure as sample #1, but used GdFeCo having the following characteristics as the readout layer 1. GdFeCo has characteristics of being in an in-plane magnetization state at room temperature and changing into a perpendicular magnetization state at 120° C. The Curie temperature of GdFeCo is 320° C.

The dependence of the CNR on the mark length shown in FIG. 4 indicates a carrier-to-noise ratio which was obtained by reproducing recording bits which were successively formed with a length corresponding to the mark length at a pitch twice longer than the mark length on the recording layer 3.

As shown in FIG. 4, when the mark length was as long as 0.6 μm, comparative sample #1 whose readout layer had a higher Curie temperature than that of sample #1 exhibited a higher CNR than the CNR of sample #1. The reason for this is that comparative sample #1 including the readout layer with a higher Curie temperature has a larger Kerr rotation angle compared to sample #1, and gives a reproduced signal with a higher carrier level.

However, it was observed through the comparison of the CNRs of these samples for a mark length of 0.4 μm that the CNR of comparative sample #1 was 39.0 dB and the CNR of sample #1 was 45.5 dB. Thus, an increase of 6.5 dB in the CNR was achieved by sample #1. This result shows that sample #1 achieved the above-mentioned double mask in the readout layer 1, thereby realizing reproduction with higher resolution than that of comparative sample #1.

Figure 5:
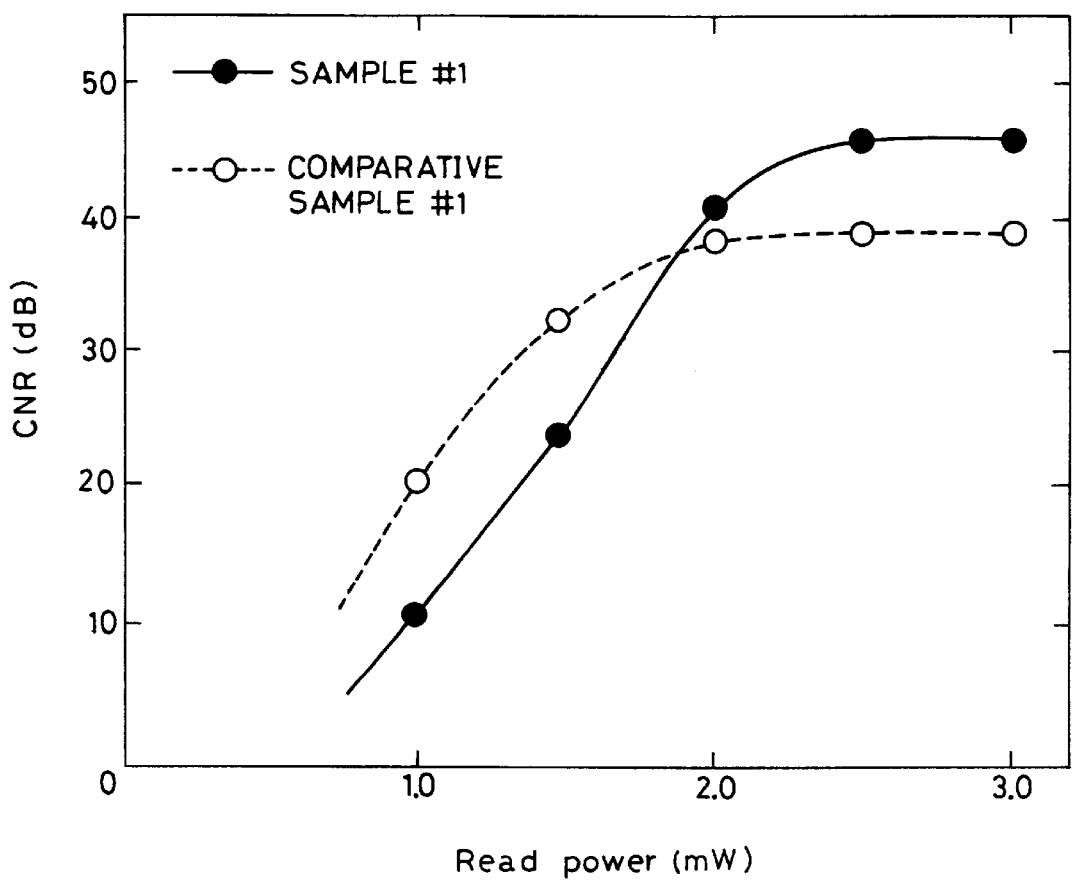
FIG. 5 is a graph showing the results of measuring the dependence of the CNR on the read power of the sample and a comparative sample when the mark length is 0.4 µm.

FIG. 5 shows the dependence of the CNRs of these samples on the read power when the mark length was 0.4 μm. As shown in FIG. 5, when the read power was lower than 2 mW, a higher CNR was achieved by comparative sample #1 having a higher carrier level. The reason for this result is that a portion whose temperature was not lower than the Curie temperature was not formed in the readout layer 1 of sample #1 by the application of a beam spot at this read power, and thus a double mask was not achieved.

However, when a read power of not lower than 2 mW was supplied, sample #1 achieved a higher CNR than that of comparative sample #1. This result was achieved by a double mask in the readout layer 1 which was realized by the presence of a portion heated to temperatures in the vicinity of its Curie temperature in the readout layer 1.

The thicknesses of the readout layers of sample #1 and comparative samples #1 were varied, and the CNRs thereof were measured for a mark length 0.4 $\mu$m. Table 1 shows the results of the measurement. In Table 1, the CNRs of sample #1 and comparative samples #1 having the same readout layer thickness are shown side by side to ease the comparison. Moreover, in this measurement, recording was performed on each of sample #1 and comparative sample #1 having the readout layer with varying thickness by changing the recording conditions so that a maximum CNR was achieved when the read power was 2.5 mW. It is understood from Table 1 that the CNR of sample #1 was higher than that of comparative sample #1 when the thickness of the readout layer was within a range of from 10 nm to 80 nm.

TABLE 1

| Thickness of readout layer (nm) | CNR of comparative sample #1 (dB) | CNR of sample #1 (dB) |
| --- | --- | --- |
| 8 | 32.5 | 31.0 |
| 10 | 34.5 | 38.0 |
| 20 | 36.5 | 42.5 |
| 25 | 39.0 | 45.5 |
| 30 | 39.0 | 45.0 |
| 40 | 39.5 | 46.0 |
| 60 | 36.5 | 45.0 |
| 80 | 34.5 | 39.0 |
| 120 | 33.5 | 32.0 |

The magnetostatic coupling between the readout layer and the recording layer of sample #1 is smaller than that of comparative sample #1 because the Curie temperature of the readout layer 1 of sample #1 is lower than that of the readout layer of comparative sample #1. The magnetostatic coupling is a force which is proportional to the thickness of the readout layer. Therefore, in sample #1 having the readout layer 1 of a lower Curie temperature, the decrease in the magnetostatic coupling force due to a reduction in the thickness of the readout layer 1 becomes significant compared to comparative sample #1. Thus, when the thickness of the readout layer 1 is made as thin as 8 nm, the magnetostatic coupling force of sample #1 becomes very small. Namely, a sufficnt magnetostatic coupling force cannot be obtained. As a result, the CNR of sample #1 becomes lower than that of comparative sample #1.

When the magnetization state of the readout layer changes to the perpendicular magnetization state from the in-plane magnetization state, the magnetic wall energy changes in the readout layer. The magnetic wall energy becomes greater as the thickness of the readout layer is increased. Therefore, in sample #1 which has a relatively small magnetostatic coupling force, when the thickness of the readout layer 1 is made as thick as 100 nm, a sufficient magnetostatic coupling force is not obtained between the readout layer 1 and the recording layer 3. Thus, the CNR of sample #1 becomes lower than that of comparative sample #1.

For the reasons mentioned above, it is necessary for the readout layer 1 of sample #1 to have a thickness within a range of from 10 nm to 80 nm.

Next, the thicknesses of the non-magnetic intermediate layers of sample #1 and comparative samples #1 were varied, and the CNRs thereof were measured for a mark length of 0.4 $\mu$m. Table 2 shows the results of the measurement. The CNRs of sample #1 and comparative samples #1 having the same non-magnetic intermediate layer thickness are shown side by side in Table 2 to ease the comparison. Moreover, in this measurement, recording was performed on each of sample #1 and comparative sample #1 having the non-magnetic intermediate layer with varying thickness by changing the recording conditions so that a maximum CNR is obtained when the read power was 2.5 mW.

It is understood from Table 2 that both of sample #1 and comparative sample #1 had a CNR of 25 dB when the thickness of the non-magnetic intermediate layer was 0.5 nm, and the effect of increasing the CNR was not observed in sample #1. The reason for this would be that good magneto-static coupling was not achieved between the readout layer 1 and the recording layer 3 because the thickness of the non-magnetic intermediate layer was too thin. It is known from Table 2 that it is necessary for the non-magnetic intermediate layer 2 to have a thickness of not less than 1 nm in order to achieve good magnetostatic coupling between the readout layer 1 and the recording layer 3.

It is also understood that when the thickness of the non-magnetic intermediate layer is 100 nm, sample #1 has a lower CNR than that of comparative sample #1. The magnetostatic coupling force exerted between the readout layer and the recording layer becomes smaller as the thickness of the non-magnetic intermediate layer is increased. Therefore, in sample #1 which has a relatively small magnetostatic coupling force, when the thickness of the non-magnetic intermediate layer is made as thick as 100 nm, a sufficient magnetostatic coupling force is not obtained. As a result, the CNR of sample #1 becomes lower than that of comparative sample #1.

TABLE 2

| Thickness of non-magnetic intermediate layer (nm) | CNR of comparative sample #1 (dB) | CNR of sample #1 (dB) |
| --- | --- | --- |
| 0.5 | 25.0 | 25.0 |
| 1 | 42.5 | 44.0 |
| 4 | 41.0 | 45.5 |
| 10 | 40.0 | 45.5 |
| 20 | 39.5 | 45.5 |
| 30 | 38.5 | 46.5 |
| 40 | 38.0 | 43.0 |
| 60 | 36.5 | 38.0 |
| 80 | 35.5 | 36.5 |
| 100 | 29.5 | 12.5 |

For the reasons mentioned above, it is necessary for the non-magnetic intermediate layer 2 to have a thickness within a range of from 1 nm to 80 nm.

Next, the thicknesses of the recording layers of sample #1 and comparative sample #1 were varied, and the CNRs thereof were measured for a mark length of 0.4 $\mu$m. Table 3 shows the results of the measurement. The CNRs of sample #1 and comparative sample #1 having the same recording layer thickness are shown side by side in Table 3 to ease the comparison. Moreover, in this measurement, recording was performed on each of sample #1 and comparative sample #1 having the recording layer with varying thickness by changing the recording conditions so that a maximum CNR is obtained when the read power was 2.5 mW.

It is understood from Table 3 that when the thickness of the recording layer is made as thin as 15 nm, the CNR of sample #1 becomes lower than that of comparative sample #1. The reason for this is that the leakage magnetic field generated from the recording layer becomes weaker as the thickness of the recording layer is decreased. Therefore, in sample #1 which has a relatively small magnetostatic coupling force, a sufficient magnetostatic coupling force is not obtained.

Moreover, when the thickness of the recording layer is made as thick as 100 nm, the CNR of sample #1 becomes lower than that of comparative sample #1. In this case, the cause for the lowering of the CNR is too large leakage magnetic field from the recording layer 3.

In comparative sample #1 using GdFeCo as the readout layer, the formation of a front mask on the readout layer, i.e., the transition from an in-plane magnetization state to a perpendicular magnetization state, is determined by the Co content of the readout layer. In the readout layer of comparative sample #1 having a relatively large Co content, the transition from the in-plane magnetization state to the perpendicular magnetization state occurs abruptly with an increase in temperature, and thus a good front mask is formed. Therefore, even when the leakage magnetic field from the recording layer becomes too large, the good front mask is retained. On the other hand, in sample #1, when the leakage magnetic field from the recording layer 3 becomes too large, the good front mask is not retained because Co is not contained. As a result, the CNR of sample #1 becomes lower than that of comparative sample #1. For the reasons mentioned above, it is necessary for the recording layer 3 of sample #1 to have a thickness within a range of from 20 nm to 80 nm.

TABLE 3

| Thickness of recording layer (nm) | CNR of comparative sample #1 (dB) | CNR of sample #1 (dB) |
| --- | --- | --- |
| 15 | 25.0 | 21.5 |
| 20 | 34.5 | 38.5 |
| 30 | 37.0 | 42.0 |
| 40 | 39.5 | 45.5 |
| 60 | 40.0 | 46.5 |
| 80 | 37.5 | 42.5 |
| 100 | 31.5 | 30.0 |

In the magneto-optical recording medium of this embodiment, the readout layer 1 is in an in-plane magnetization state at room temperature, and changes into a perpendicular magnetization state with an increase in temperature. However, the present invention is not necessarily limited by this readout layer, and may have a readout layer which is in a perpendicular magnetization state from room temperature to the Curie temperature.

Figure 6:
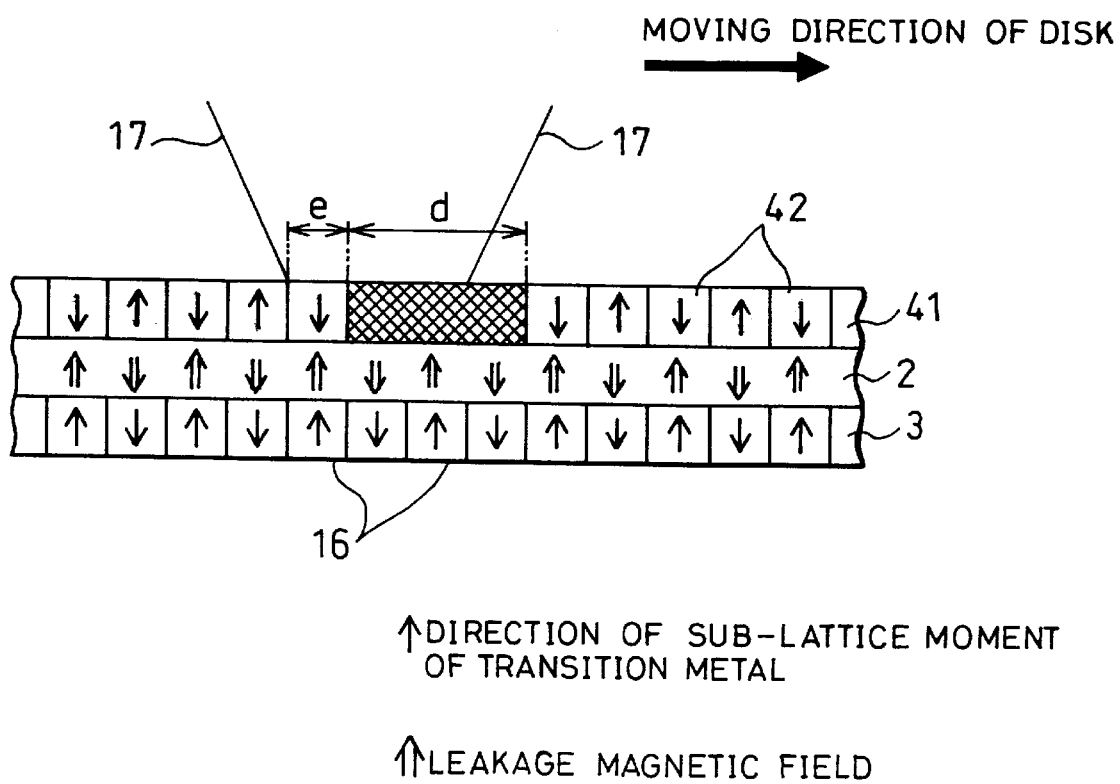
FIG. 6 is an explanatory view for explaining a schematic structure of the magneto-optical recording medium of Embodiment 1 wherein the readout layer shows a perpendicular magnetization state at room temperature, and the reproducing operation.

FIG. 6 is an explanatory view for explaining a schematic structure of such a magneto-optical recording medium, and the reproducing operation. As shown in FIG. 6, this magneto-optical recording medium is fabricated by layering a readout layer 41, the non-magnetic intermediate layer 2, and the recording layer 3 in this order. The readout layer 41 is a magnetic film which has a low Curie temperature, is in a perpendicular magnetization state from room temperature to the Curie temperature, and achieves magnetostatic coupling with the recording layer 3 through the non-magnetic intermediate layer 2.

As shown in FIG. 6, in a portion of this magneto-optical recording medium, which is not exposed to the light beam 17, the magnetic domains 42 of the readout layer 41 copy the magnetization of the recording bits 16 on the corresponding recording layer 3. Moreover, in a portion of the readout layer 41 of this magneto-optical recording medium, which is exposed to the light beam 17, a high-temperature region d and a region e where the recording bits 16 are copied are formed. The region d is a region having a temperature exceeding the Curie temperature of the readout layer 41. The magnetic domains 42 in the high-temperature region d do not copy the magnetization of the recording bits 16 on the corresponding recording layer 3. In this structure, since only the magnetic domain in the region e is involved in reproduction, super-resolution reproduction can be achieved even when recording is performed at high density.

[Embodiment 2]

The following description will explain Embodiment 2 of the present invention. The members having the same function as in the above-mentioned embodiment will be designated by the same code and their description will be omitted.

FIGS. 7(a) and 7(b) are explanatory views for explaining the principle of a super-resolution reproducing operation with a super-resolution magneto-optical recording medium (hereinafter just referred to the magneto-optical recording medium) of this embodiment. FIG. 7(b) explains a schematic structure of the magneto-optical recording medium of this embodiment, and the magnetizations of the layers 1, 3 and 9 of this medium in a reproduction state. FIG. 7(a) explains the temperature distribution formed on the readout layer 1 by the application of the light beam 17.

As illustrated in FIG. 7(b), in addition to the structure of the magneto-optical recording medium shown in FIG. 1(b), the magneto-optical recording medium of this embodiment includes an in-plane magnetization layer 9 adjacent to the readout layer 1. As described in Embodiment 1, the Curie temperature of the readout layer 1 is lower than the Curie temperature of the readout layer 91 of the conventional medium shown in FIG. 2(b).

In Embodiment 1, for the sake of simplifying the explanation, it is assumed that the magnetization state changes instantly from an in-plane direction to a perpendicular direction with respect to the plane of readout layer 1 when the readout layer 1 is heated to a temperature exceeding the critical temperature.

However, in actual fact, the Gaussian temperature distribution is produced on the readout layer 1 with the application of a light beam having the Gaussian temperature distribution. The magnetization state of the readout layer 1 gradually changes from the in-plane magnetization state to the perpendicular magnetization state according to this temperature distribution. Thus, even in the first-temperature region which is shown as being in the perfect in-plane magnetization state in FIG. 1(a), perpendicular magnetization components are present according to the temperature distribution of the readout layer 1. As a result, the super-resolution reproducing operation with the magneto-optical recording medium deteriorates.

In the magneto-optical recording medium of this embodiment, exchange coupling is achieved between the readout layer 1 and the in-plane magnetization layer 9 adjacent to the readout layer 1. Therefore, the readout layer 1 readily changes into the in-plane magnetization state within a temperature range in which the in-plane magnetization layer 9 has a magnetization. Consequently, the perpendicular magnetization components in the front mask portion of the readout layer 1, i.e., in the first-temperature region outside the isotherm 11 shown in FIG. 7(a), which are produced according to the temperature distribution of the readout layer 1, are reduced. It is thus possible to achieve a good super-resolution reproducing operation with the use of the magneto-optical recording medium of this embodiment.

Figure 8:
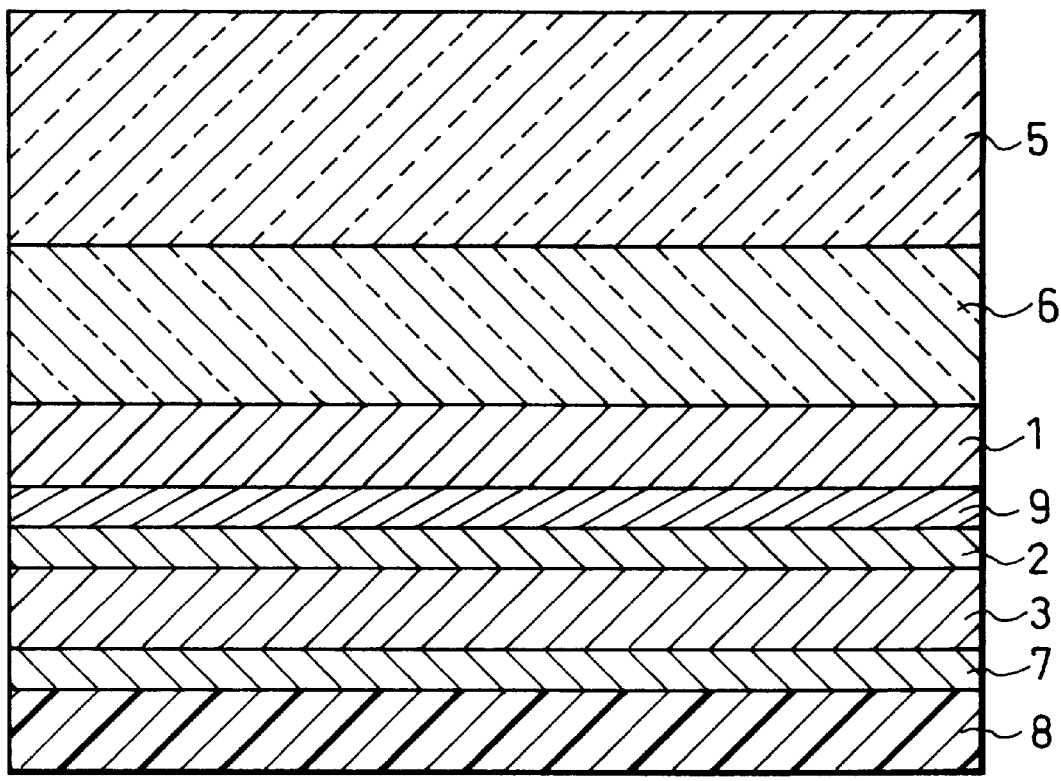
FIG. 8 is a cross sectional view showing a schematic structure of a magneto-optical disk according to Embodiment 2.

The following description will explain a magneto-optical disk as one example of the magneto-optical recording medium of this embodiment. FIG. 8 is a cross sectional view showing a schematic structure of the magneto-optical disk. As illustrated in FIG. 8, the magneto-optical disk has the same structure as that of the magneto-optical disk of Embodiment 1 with an exception that the in-plane magnetization layer 9 is formed between the readout layer 1 and the non-magnetic intermediate layer 2.

It is preferred that the in-plane magnetization layer 9 is formed by a magnetic film made of a rare-earth and transition metal alloy with a composition which is arranged so that the in-plane magnetization layer 9 has a magnetization in an in-plane direction with respect to the plane of the film until its Curie temperature. A preferred Curie temperature of the in-plane magnetization layer 9 is within a range of from 60° C. to 180° C.

(1) Fabrication Process of the Magneto-Optical Disk

The following description will explain a process for fabricating the magneto-optical disk of this embodiment having the above-mentioned structure. The fabrication process described below is of one example. The magneto-optical disk fabricated in this example is given as sample #2.

Sample #2 is fabricated in the same manner as sample #1 described in Embodiment 1 with an exception that the in-plane magnetization layer 9 is formed successive to the formation of the readout layer 1. Thereafter, the non-magnetic intermediate layer 2, the recording layer 3, the protective layer 7, and the overcoat layer 8 are formed in this order on the in-plane magnetization layer 9 to give sample #2.

The in-plane magnetization layer 9 is formed on the readout layer 1 by sputtering by supplying power to a second GdFeAl target under a gas pressure of $4 \times 10^{-3}$ Torr. The in-plane magnetization layer 9 is a film having the composition $(Gd_{0.11}Fe_{0.89})_{0.82}Al_{0.18}$, and a thickness of 5 nm. The in-plane magnetization layer 9 has a Curie temperature of 120° C., and a magnetization in an in-plane direction of the film up to the Curie temperature.

Sample #2 of the magneto-optical disk is fabricated through the above-mentioned process. The thickness and composition of the in-plane magnetization layer 9 of sample #2 are not necessarily limited to those mentioned above. However, the following description is made using the above-mentioned thickness and composition unless otherwise particularly specified. In addition, the thicknesses and compositions of the layers 1 to 8 other than the in-plane magnetization layer 9 of sample #2 are the same as those of sample #1.

(2) Recording and Reproduction Characteristics

Figure 9:
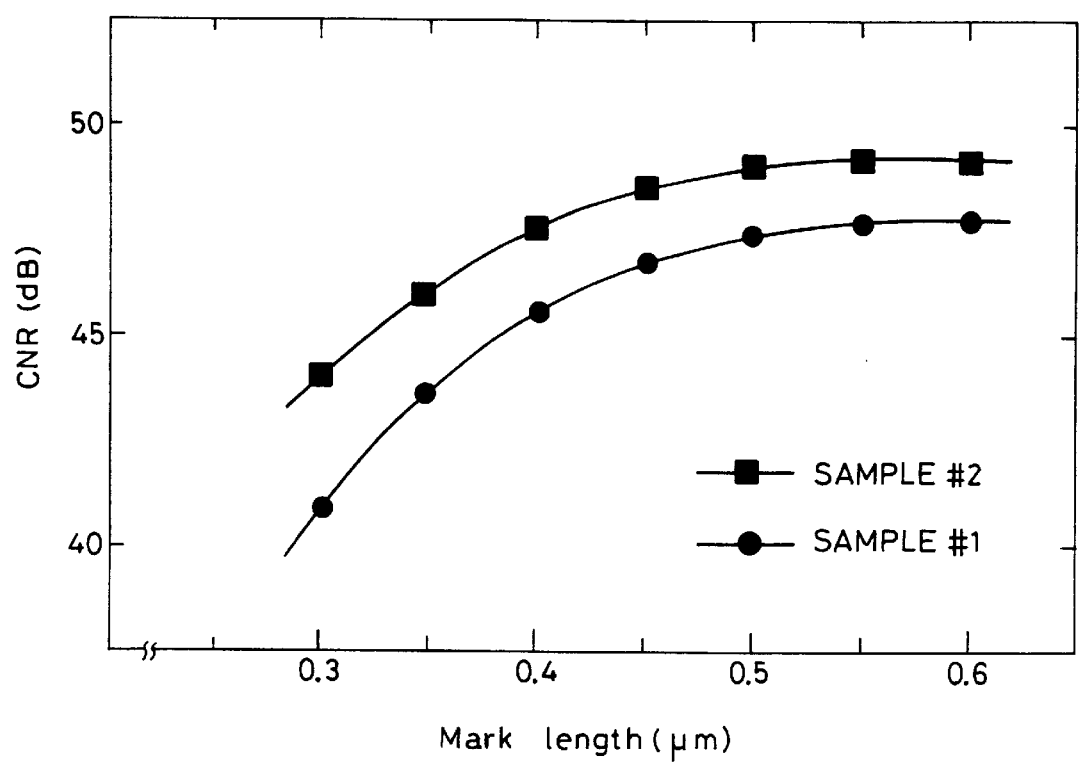
FIG. 9 is a graph showing the results of measuring the dependence of the CNR on the mark length of a sample of the magneto-optical disk shown in FIG. 8 and the sample of the magneto-optical disk shown in FIG. 3.

Sample #2 fabricated in the manner mentioned in (1) was measured to find the dependence of the CNR on the mark length. The measurement was performed with an optical pickup using a semiconductor laser having a wavelength of 680 nm. The laser power used for the measurement was 2.5 mW. The results of the measurement are shown in FIG. 9. The results of measuring sample #1 is also shown in FIG. 9 for comparison purposes.

As shown in FIG. 9, when the mark length was 0.6 μm, the CNR of sample #1 was 47.5 dB. On the other hand, the CNR of sample #2 was 49.0 dB, showing an increase of 1.5 dB compared to sample #1.

When the mark length was 0.4 μm, the CNR of sample #1 was 45.5 dB. On the other hand, the CNR of sample #2 was 47.5 dB, showing an increase of 2.0 dB compared to sample #1.

It is known that the difference in CNR between samples #1 and #2 becomes greater with a decrease in the mark length. This means that, in comparison with sample #1, sample #2 achieves the double mask more effectively in the readout layer 1 and performs reproduction with higher resolution.

With regard to the thicknesses of the readout layer 1 and the recording layer 3 of the magneto-optical disk of this embodiment, the thickness of the readout layer 1 needs to be within a range of from 10 nm to 80 nm, and the thickness of the recording layer 3 needs to be within a range of 20 nm and 80 nm for the reasons described in Embodiment 1.

The thickness of the in-plane magnetization layer 9 of sample #2 was varied, and the CNR thereof was measured for a mark length 0.4 μm. Table 4 shows the results of the measurement as CNR 42. Moreover, the thickness of the non-magnetic intermediate layer 2 of a magneto-optical disk having the same structure as that of sample #1 was varied, and the CNR thereof was measured in the same manner for comparison purposes. The results of the measurement is shown as CNR 41 in Table 4. The thickness of the non-magnetic intermediate layer 2 of sample #1 is equal to the sum of the thicknesses of the corresponding in-plane magnetization layer 9 and non-magnetic intermediate layer 2 (20 nm) of sample #2.

TABLE 4

| Thickness of in-plane magnetizaton film (nm) | CNR 42 (dB) | CNR 41 (dB) |
|---|---|---|
| 1 | 45.5 | 45.5 |
| 2 | 46.5 | 45.5 |
| 5 | 47.5 | 46.0 |
| 10 | 47.5 | 46.5 |
| 20 | 46.0 | 43.0 |
| 40 | 42.5 | 38.0 |
| 60 | 39.0 | 36.5 |
| 80 | 10.5 | 12.5 |

It is understood from Table 4 that, when the thickness of the in-plane magnetization layer 9 was 1 nm, the CNR 42 was equal to the CNR 41, and thus an improvement of reproduction resolution by the in-plane magnetization layer 9 was not observed. When the film thickness of the in-plane magnetization layer 9 was not less than 2 nm, the CNR 42 was greater than the CNR 41. This means that the reproduction resolution of sample #2 is improved compared to that of sample #1.

When the film thickness of the in-plane magnetization layer 9 was increased to 80 nm, the CNR 42 considerably decreased to 10.5 dB and became lower than the CNR 41. Similarly to sample #1, this result is caused by an increase in the distance between the readout layer 1 and the recording layer 3, and a reduction of the magnetostatic coupling force exerted between the readout layer 1 and the recording layer 3. Therefore, the reproducing operation becomes unstable, and the CNR deteriorate extremely.

For the reasons mentioned above, the thickness of the in-plane magnetization layer 9 of sample #2 needs to be not less than 2 nm, and the sum of the thicknesses of the in-plane magnetization layer 9 and non-magnetic intermediate layer 2 needs to be not more than 80 nm.

As described above, $(Gd_{0.3}Fe_{0.7})_{0.93}Al_{0.07}$ which shows perpendicular magnetization at 120° C. and has a Curie temperature of 200° C. was used for the readout layer 1 of samples #1 and #2.

The following description will present the results of measuring the super-resolution reproduction characteristics of samples #1 and #2 while varying the composition ratio of the GdFeAl alloy of the readout layer 1 of samples #1 and #2.

The CNRs of sample #1 and #2 having the readout layer 1 of the composition $(Gd_{0.30}Fe_{0.70})_Y Al_{1-Y}$ were measured by changing by the value of Y (atom %). The results of the measurements are shown in Table 5. Moreover, for comparison purposes, the CNR was measured for a structure using a readout layer made of $Gd_{0.30}(Fe_{0.75}Co_{0.25})_{0.70}$ with a Curie temperature of 320° C. (hereinafter referred to as the comparative readout layer) as the readout layer 1. The results of the measurement is also shown in Table 5. In the structure using the comparative readout layer, a region having a temperature exceeding the Curie temperature of the readout layer 1 like the third-temperature region inside the isotherm 12 shown in FIGS. 1(a) and 7(a) was not produced by the application of a light beam during reproduction. Therefore, the double mask which is achieved by samples #1 and #2 and unique to the present invention was not produced. In Table 5, the result of the measurement of sample #1 is shown as CNR 51, while the results of the measurement of sample #2 is shown as CNR 52. The measurements of the CNRs were performed with the use of an optical pickup having a semiconductor laser with a wavelength of 680 nm for a mark length of 0.4 μm. The results of measuring the Curie temperature Tc of the respective compositions of the readout layer 1 are also shown in Table 5.

TABLE 5

| Y | Tc (° C.) | CNR 51 (dB) | CNR 56 (dB) |
|---|---|---|---|
| 1.00 | 220 | 45.0 | 47.5 |
| 0.93 | 200 | 45.5 | 47.5 |
| 0.81 | 180 | 45.0 | 45.5 |
| 0.70 | 150 | 41.5 | 41.5 |
| 0.60 | 120 | 35.5 | 32.5 |
| Comparative readout layer | 320 | 39.0 | 41.0 |

It is known from Table 5 that when Y satisfies $0.70 \leq Y \leq 1.00$, both of the CNRs 51 and 52 are greater than the CNR of the structure using the comparative readout layer made of GdFeCo with a Curie temperature of 320° C. as the readout layer 1.

Therefore, by forming the readout layer 1 from $(Gd_{0.30}Fe_{0.70})_Y Al_{1-Y}$ and setting the value of Y (atom %) to satisfy the condition $0.70 \leq Y \leq 1.00$, it is possible to achieve a double mask unique to the present invention and obtain good super-resolution reproduction characteristics in the structures of samples #1 and #2. It is also known from Table 5 that a preferred Curie temperature of the readout layer 1 is within a range of from 150° C. to 220° C.

Next, the CNRs of samples #1 and #2 having the readout layer 1 of the composition $(Gd_X Fe_{1-X})_{0.93}Al_{0.07}$ were measured by changing the value of X (atom %). The results of the measurements are shown in Table 6. The measurements of the CNRs were performed with the use of an optical pickup having a semiconductor laser with a wavelength of 680 nm for a mark length of 0.4 μm. In Table 6, the result of the measurement of sample #1 is shown as CNR 61, while the results of the measurement of sample #2 is shown as CNR 62. Moreover, for comparison purposes, the CNR of a structure using $Gd_X(Fe_{0.75}Co_{0.25})_{1-X}$ where X represents the proportion of the rare-earth metal to the transition metal alloy is given as CNR 101.

TABLE 6

| X | CNR 61 (dB) | CNR 62 (dB) | CNR 101 (dB) |
|---|---|---|---|
| 0.27 | 25.0 | 24.5 | 22.0 |
| 0.28 | 41.0 | 41.5 | 31.5 |
| 0.29 | 44.0 | 46.0 | 36.5 |
| 0.30 | 45.5 | 47.5 | 39.0 |
| 0.31 | 45.0 | 45.5 | 37.0 |
| 0.32 | 42.0 | 43.5 | 31.5 |
| 0.33 | 27.0 | 28.5 | 20.0 |

It is known from Table 6 that both of the CNRs 61 and 62 are higher than the CNR 101. This means that the double mask unique to the present invention was achieved, and good super-resolution reproduction characteristics were obtained.

However, the structures in which X is 0.27 or 0.33 have a low CNR of not higher than 30 dB, and are not practical. It is understood from Table 6 that it is necessary to satisfy the condition $0.28 \leq X \leq 0.32$ in order to obtain good reproduction characteristics.

In Embodiments 1 and 2, the structures using the GdFe alloy or the GdFeAl alloy as the readout layer 1 of samples #1 and #2 are explained. However, as described below, it is possible to use a GdFeCo alloy, a GdFeTi alloy, a CdFeTa alloy, a GdFePt alloy, a GdFeAu alloy, a GdFeCu alloy, etc. as the readout layer 1.

The material of the readout layer 1 was changed to the above-mentioned alloys, and the CNRs of samples #1 and #2 were measured. The results of the measurements are shown in Table 7. In Table 7, the result of the measurement of sample #1 is shown as CNR 71, while the results of the measurement of sample #2 is shown as CNR 72. For comparison purposes, the CNR of a structure using a comparative readout layer made of $Gd_{0.30}(Fe_{0.75}Co_{0.25})_{0.70}$ with a Curie temperature of 320° C. as the readout layer 1 was measured. The results of the measurement is also shown in Table 7. The measurements of the CNRs were performed with the use of an optical pickup having a semiconductor laser with a wavelength of 680 nm for a mark length of 0.4 μm. The results of measuring the Curie temperature Tc of the respective alloys used as the material for the readout layer 1 are also shown in Table 7.

TABLE 7

| Composition of readout layer 1 | Tc (° C.) | CNR 71 (dB) | CNR 72 (dB) |
|---|---|---|---|
| $Gd_{0.30}(Fe_{0.95}Co_{0.05})_{0.70}$ | 230 | 43.0 | 44.5 |
| $Gd_{0.30}(Fe_{0.90}Co_{0.10})_{0.70}$ | 250 | 40.5 | 41.5 |
| $Gd_{0.30}(Fe_{0.85}Co_{0.15})_{0.70}$ | 270 | 33.0 | 34.5 |
| $Gd_{0.30}(Fe_{0.70})_{0.93}Ti_{0.07}$ | 210 | 45.5 | 47.5 |
| $Gd_{0.30}(Fe_{0.70})_{0.93}Ta_{0.70}$ | 190 | 44.0 | 46.5 |
| $Gd_{0.30}(Fe_{0.70})_{0.93}Pt_{0.70}$ | 220 | 44.5 | 46.5 |
| $Gd_{0.30}(Fe_{0.70})_{0.93}Au_{0.70}$ | 200 | 45.5 | 48.0 |
| $Gd_{0.30}(Fe_{0.70})_{0.93}Cu_{0.70}$ | 180 | 44.0 | 46.5 |
| $Gd_{0.30}(Fe_{0.75}Co_{0.25})_{0.70}$ | 320 | 39.0 | 41.0 |

It is understood from Table 7 that the CNRs of the structures using $Gd_{0.30}(Fe_{0.85}Co_{0.15})_{0.70}$ as the readout layer 1 of samples #1 and #2 are lower than the CNRs of the structures using the comparative readout layer.

However, in the structures using the other alloys as the material for the readout layer 1, both of the CNRs 71 and 72 are higher than the CNRs of the structures using the comparative readout layer. This means that the double mask unique to the present invention was achieved, and good super-resolution reproduction characteristics were obtained in samples #1 and #2 having the readout layer 1 of such compositions. It is also possible to use a combination of the above-mentioned materials as the material for the readout layer 1. It is also known from the relationship between the Curie temperature Tc of the readout layer 1 and the CNRs 71 and 72 shown in Table 7 that it is possible to obtain higher CNRs than the CNRs of the structures using the comparative readout layer by arranging the Curie temperature not to be higher than 250° C.

As described above, it was confirmed from the results of the measurement shown in Table 5 that a preferred Curie temperature of the readout layer 1 is not lower than 150° C. Therefore, it is understood from this confirmation and the results of the measurement shown in Table 7 that the Curie temperature of the readout layer 1 of samples #1 and #2 need to be within a range of from 150° C. to 250° C.

The measurement shown in Table 4 is a measurement of the recording and reproduction characteristics of the structure using $(Gd_{0.11}Fe_{0.89})_{0.82}Al_{0.18}$ with a Curie temperature of 120° C. as the in-plane magnetization layer 9 of sample #2. The Al content of the in-plane magnetization layer 9 was varied, and the recording and reproduction characteristics of sample #2 were measured. The results are shown in Tables 8 and 9.

The CNR of sample #2 having the in-plane magnetization layer 9 made of $(Gd_{0.11}Fe_{0.89})_Y Al_{1-Y}$ was measured by changing the value of Y (atom %). The results of the measurement are shown in Table 8. The thickness of the in-plane magnetization layer 9 was 5 nm. The results of measuring the CNR of a magneto-optical disk having no in-plane magnetization layer 9 in the structure of sample #2 is also shown as a comparative example. In Table 8, the result of the measurement of sample #2 of the respective structures is shown as CNR 82. The measurement of the CNR was performed with the use of an optical pickup having a semiconductor laser with a wavelength of 680 nm for a mark length of 0.4 μm. The results of measuring the Curie temperature Tc of the respective compositions of the in-plane magnetization layer 9 are also shown in Table 8.

It is understood from Table 8 that a CNR higher than the CNR (45.5 dB) of the comparative example having no in-plane magnetization layer 9 is obtained by satisfying the condition $0.30 \leq Y \leq 0.90$.

The readout layer 1 used for the sample #2 and comparative example for this measurement is the same as the readout layer 1 of sample #1 of Embodiment 1, and changes into a perpendicular magnetization state at 120° C. Namely, it is necessary for the in-plane magnetization layer 9 to emphasize the in-plane magnetization mask of the readout layer 1 at temperatures not higher than 120° C., and the optimum value of the Curie temperature of the in-plane magnetization layer 9 is 120° C. However, as shown in Table 8, a higher CNR than that of the comparative example was obtained when the Curie temperature of the in-plane magnetization layer 9 is within a range of from 60° C. to 180° C. Therefore, it can be said that it is possible to emphasize the in-plane magnetization mask by arranging the Curie temperature of the in-plane magnetization 9 to fall within a range of from 60° C. to 180° C.

TABLE 8

| Y | Tc (° C.) | CNR 82 (dB) |
|---|---|---|
| 0.25 | 40 | 42.0 |
| 0.30 | 60 | 46.0 |
| 0.40 | 85 | 46.5 |
| 0.60 | 105 | 47.5 |
| 0.72 | 120 | 47.5 |
| 0.80 | 145 | 47.5 |
| 0.90 | 180 | 46.0 |
| 0.95 | 200 | 44.0 |
| Comparative example | — | 45.5 |

The CNR of sample #2 having the in-plane magnetization layer 9 made of $(Gd_X Fe_{1-X})_{0.82} Al_{0.18}$ was measured by changing the value of X (atom %). The results of the measurement are shown in Table 9. The thickness of the in-plane magnetization layer 9 was 5 nm. The results of measuring the CNR of a magneto-optical disk having no in-plane magnetization layer 9 in the structure of sample #2 is also shown as a comparative example. In Table 9, the results of the measurement of the respective compositions of sample #2 are shown as CNR 92. The measurement of the CNR was performed with the use of an optical pickup having a semiconductor laser with a wavelength of 680 nm for a mark length of 0.4 μm.

It is understood from Table 9 that a higher CNR than the CNR (45.5 dB) of the comparative example having no in-plane magnetization layer 9 is obtained by satisfying the condition $0 \leq X \leq 0.18$, or $0.33 \leq X \leq 1.00$.

TABLE 9

| X | CNR 92 (dB) |
|---|---|
| 0.00 | 46.0 |
| 0.05 | 47.0 |
| 0.11 | 47.5 |
| 0.18 | 46.0 |
| 0.22 | 39.0 |
| 0.30 | 37.0 |
| 0.33 | 46.5 |
| 0.40 | 47.0 |
| 0.60 | 47.0 |
| 0.80 | 46.5 |
| 1.00 | 46.0 |
| Comparative example | 45.5 |

The readout layer 1 used for sample #2 for the measurement shown in Table 9 is the same as the readout layer 1 of sample #1 of Embodiment 1, and changes into a perpendicular magnetization state at 120° C. Namely, it is necessary for the in-plane magnetization layer 9 to be in an in-plane magnetization state at least at temperatures not higher than 120° C. in order to emphasize the in-plane magnetization mask of the readout layer 1. When X is in the range $0.18 \leq X \leq 0.33$, the in-plane magnetization layer 9 is in the perpendicular magnetization state, and thus an effect of emphasizing the in-plane magnetization mask of the readout layer 1 is not produced.

For the reasons mentioned above, in the in-plane magnetization layer 9 made of $(Gd_X Fe_{1-X})_Y Al_{1-Y}$, Y needs to satisfy $0.30 \leq Y \leq 0.90$, and X needs to satisfy $0 \leq X \leq 0.18$, or $0.33 \leq X \leq 1.00$.

Tables 8 and 9 show the results of the measurements of the CNR when the in-plane magnetization layer 9 is made of GdFeAl. However, it is possible to use GdFeTi, GdFeTa, GdFePt, GdFeAu, GdFeCu, GdFeAlTi, GdFeAlTa, NdFe, NdFeAl, DyFe, and DyFeAl as the material of the in-plane magnetization layer 9 as long as these materials have their Curie temperature in the above-mentioned range (60° C. to 180° C.).

The CNR of sample #2 having the in-plane magnetization layer 9 made of each of the above-mentioned materials was measured. The results of the measurement are shown in Table 10. The thickness of the in-plane magnetization layer 9 was 20 nm. The results of measuring the CNR of a magneto-optical disk having no in-plane magnetization layer 9 is also shown as a comparative example. In Table 10, the results of the measurement of the respective structures of sample #2 are shown as CNR 102. The measurement of the CNR was performed with the use of an optical pickup having a semiconductor laser with a wavelength of 680 nm for a mark length of 0.4 μm. The results of measuring the Curie temperature Tc of the respective materials of the in-plane magnetization layer 9 are also shown in Table 10.

TABLE 10

| Composition of in-plane magnetization layer 9 | Tc (° C.) | CNR 102 (dB) |
| --- | --- | --- |
| $(Gd_{0.11}Fe_{0.89})_{0.75}Ti_{0.25}$ | 110 | 46.5 |
| $(Gd_{0.11}Fe_{0.89})_{0.75}Ta_{0.25}$ | 120 | 47.5 |
| $(Gd_{0.11}Fe_{0.89})_{0.75}Pt_{0.25}$ | 125 | 47.0 |
| $(Gd_{0.11}Fe_{0.89})_{0.75}Au_{0.25}$ | 120 | 48.0 |
| $(Gd_{0.11}Fe_{0.89})_{0.75}Cu_{0.25}$ | 115 | 46.5 |
| $Nd_{0.11}Fe_{0.89}$ | 90 | 46.5 |
| $Nd_{0.11}Fe_{0.89})_{0.90}Al_{0.10}$ | 80 | 46.0 |
| $Dy_{0.09}Fe_{0.91}$ | 100 | 46.5 |
| $(Dy_{0.09}Fe_{0.91})_{0.85}Al_{0.15}$ | 85 | 46.5 |
| Comparative example | — | 45.5 |

It is understood from Table 10 that the CNRs of all of the structures using GdFeTi, GdFeTa, GdFePt, GdFeAu, GdFeCu, NdFe, NdFeAl, DyFe, and DyFeAl as the in-plane magnetization layer 9 are higher than the CNR of the comparative example. A preferred Curie temperature of the materials for the in-plane magnetization layer 9 is within a range of from 60° C. to 180° C. It is also possible to use a film made of a combination of the above-mentioned materials as the in-plane magnetization layer 9.

In this embodiment, it is described that the in-plane magnetization layer 9 reduces the perpendicular magnetization components in the region having in-plane magnetization of the readout layer 1, i.e., in the first-temperature region, to a low level. However, the function of the in-plane magnetization layer 9 is not necessarily limited to this. By setting the Curie temperature of the in-plane magnetization layer 9 at a temperature higher than the critical temperature of the readout layer 1, i.e., a phase transition temperature at which a transition from an in-plane magnetization state to a perpendicular magnetization state occurs, it is possible to narrow the region showing perpendicular magnetization of the readout layer 1, i.e., the second-temperature region. As a result, the diameter and the intervals of the recording bits 16 on the recording layer 3 can be further decreased.

[Embodiment 3]

The following description will explain Embodiment 3 of the present invention. The members having the same function as in the above-mentioned embodiments will be designated by the same code and their description will be omitted.

In the magneto-optical recording media described in Embodiments 1 and 2 above, magnetostatic coupling is achieved between the readout layer 1 and the recording layer 3. Whereas in a magneto-optical recording medium of this embodiment, exchange coupling is achieved between a readout layer and a recording layer.

Figure 10:
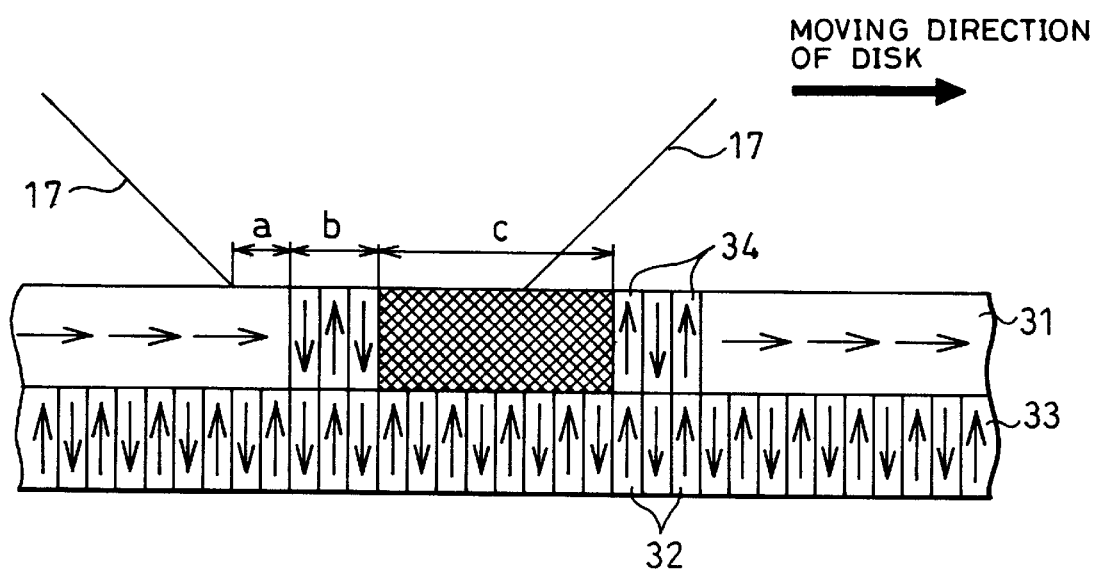
FIG. 10 is an explanatory view for explaining a schematic structure of a magneto-optical recording medium of Embodiment 3, and the reproduction principle.

FIG. 10 is an explanatory view for explaining a schematic structure of the magneto-optical recording medium of this embodiment, and the principle of a reproducing operation. As shown in FIG. 10, this magneto-optical recording medium is constructed by layering the readout layer 31 and the recording layer 33. The readout layer 31 is a magnetic film made of a rare-earth and transition metal alloy which is adjusted so that the readout layer 31 is in an in-plane magnetization state at room temperature and changes into a perpendicular magnetization state when heated to temperatures exceeding the critical temperature. The recording layer 33 is a magnetic film made of a rare-earth and transition metal alloy whose composition is adjusted so that the recording layer 33 shows a perpendicular magnetization state from room temperature to at least the Curie temperature of the readout layer 31.

As illustrated in FIG. 10, in the magneto-optical recording medium of this embodiment, these two layers 31 and 33 are placed adjacent to each other, and achieve exchange coupling. Therefore, the magnetizations of the readout layer 31 and the recording layer 33 strongly affect each other. However, the compositions thereof are adjusted so that the readout layer 31 is in the in-plane magnetization state and the recording layer 33 is in the perpendicular magnetization state at room temperature in spite of such strong coupling.

When the magneto-optical recording medium of this embodiment is heated by the application of the light beam 17, as shown in FIG. 10, three different temperature regions a, b and c are produced in the portion exposed to the light beam 17. The temperature of the region a is not raised much, and the readout layer 31 shows the in-plane magnetization state in the region a. The region a is a region like the first-temperature region of Embodiments 1 and 2. The region b is a region of the readout layer 31, which is heated to a temperature exceeding the critical temperature and shows the perpendicular magnetization state, and copies the magnetization of the recording layer 33 like in the second-temperature region of Embodiments 1 and 2. At this time, the direction of transition metal sub-lattice moments in the magnetic domains 34 of the readout layer 31 in the region b becomes the same as the direction of the transition metal sub-lattice moments of the recording bits 32 formed on the recording layer 33 which achieves exchange coupling with the readout layer 31.

The temperature of the region c is further raised to a temperature in the vicinity of the Curie temperature of the readout layer 31. The magnetization of the readout layer 31 is eliminated in the region c. Therefore, it is impossible to copy the magnetization of the recording bits 32 on the recording layer 33 in the region c.

As described above, in the magneto-optical recording medium shown in FIG. 10, the regions a, b and c are formed within the light beam spot, and only the region b contributes to the reproducing operation. It is thus possible to decrease the diameter and intervals of the recording bits 32 to be formed on the recording layer 33.

As described above, in the method of reproducing information on the magneto-optical recording media of Embodiments 1 to 3 by applying a light beam to the magneto-optical recording media having a readout layer which is in an in-plane magnetization state at room temperature and changes into a perpendicular magnetization state at temperatures not lower than the critical temperature, and a recording layer made of a perpendicular magnetization film which is magnetically coupled with the readout layer and by reproducing the recorded information based on reflected light from the magneto-optical recording media, a region which is heated to at least a temperature in the vicinity of the Curie temperature of the readout layer is produced within a portion of the readout layer, exposed to the light beam.

Moreover, the magneto-optical recording media of Embodiments 1 to 3 have a readout layer which is in-plane magnetization state at room temperature and changes into a perpendicular magnetization state at temperatures exceeding the critical temperature, have a recording layer made of a perpendicular magnetization film which is magnetically coupled with the readout layer, allow reproduction of information recorded on the recording layer by the application of a light beam to the readout layer, and are arranged so that the readout layer is heated to at least a temperature in the vicinity of the Curie temperature of the readout layer by the application of the light beam during reproduction.

In the above-mentioned reproduction method and structure, a front mask is formed by an in-plane magnetization mask in a portion of the readout layer, where the temperature is not raised, and a rear mask is formed in a portion of the readout layer, where the temperature is increased and Kerr rotation angle is decreased or eliminated. Thus, even when recording and reproduction are performed with a small recording bit diameter at smaller recording bit intervals, it is possible to obtain sufficient reproduced signals, i.e., achieve magnetic super-resolution reproduction of higher resolution, by forming the double mask on the readout layer.

Additionally, by placing the in-plane magnetization layer adjacent to the readout layer, the in-plane magnetization mask of the readout layer can be emphasized and an improved double mask can be realized. Thus, even when recording and reproduction are performed with a small recording bit diameter at smaller recording bit intervals, it is possible to obtain sufficient reproduced signals, i.e., achieve magnetic super-resolution reproduction of higher resolution.

Moreover, in the above-mentioned magneto-optical recording media, the readout layer is arranged to be heated to temperatures not lower than a temperature in the vicinity of the Curie temperature by the application of the light beam during reproduction. For example, since the Curie temperature of the readout layer is set at a temperature within a range of from 150° C. to 250° C., a front mask is formed by the in-plane magnetization mask in the portion of the readout layer, where the temperature is not raised, and a rear mask is formed in the portion of the readout layer, where the temperature is increased and Kerr rotation angle is decreased or eliminated. Therefore, even when recording and reproduction are performed with a small recording bit diameter at smaller recording bit intervals, it is possible to obtain sufficient reproduced signals, i.e., achieve magnetic super-resolution reproduction of higher resolution.

Furthermore, by providing a non-magnetic intermediate layer between the readout layer and the recording layer, it is possible to completely break the exchange coupling between the readout layer and the recording layer, and achieve good magnetostatic coupling between the readout layer and the recording layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium including a readout layer which is in an in-plane magnetization state at room temperature and changes into a perpendicular magnetization state at temperatures not lower than a critical temperature, and a recording layer made of a perpendicular magnetization film which is magnetically coupled with said readout layer, said magneto-optical recording medium allowing reproduction of information recorded on said recording layer by application of a light beam to said readout layer,
   wherein said readout layer is heated to at least a temperature in the vicinity of a Curie temperature of said readout layer by the application of said light beam during reproduction and
   wherein said readout layer is made of an alloy represented by $(Gd_{X1}Fe_{1-X1})_{Y1}Al_{1-Y1}$ where X1 and Y1 satisfy conditions $0.28 \leq X1 \leq 0.32$, and $0.70 \leq Y1 \leq 1.00$.

2. The magneto-optical recording medium as set forth in claim 1, wherein the Curie temperature of said readout layer is within a range of from 150° C. to 250° C.

3. The magneto-optical recording medium as set forth in claim 1, further comprising an in-plane magnetization layer having a Curie temperature lower than the Curie temperature of said readout layer, for emphasizing the in-plane magnetization state of said readout layer at temperatures not higher than the Curie temperature, said in-plane magnetization layer being provided in contact with said readout layer.

4. The magneto-optical recording medium as set forth in claim 3, wherein the Curie temperature of said in-plane magnetization layer is within a range of from 60° C. top 180° C.

5. The magneto-optical recording medium as set forth in claim 3, wherein said in-plane magnetization layer is made of an alloy represented by $(Gd_{X2}Fe_{1-X2})_{Y2}Al_{1-Y2}$ where X2 satisfies one of conditions $0 \leq X2 \leq 0.18$ or $0.33 \leq X2 \leq 1.00$, and Y2 satisfies condition $0.30 \leq Y2 \leq 0.90$.

6. A magneto-optical recording medium comprising:
   a recording layer made of a perpendicular magnetization film;
   a readout layer made of a magnetic film which is in an in-plane magnetization state between room temperature and a critical temperature and in a perpendicular magnetization state between the critical temperature and a Curie temperature thereof, where the critical temperature and the Curie temperature are set so, when a light beam is projected onto said medium, a first portion of said readout layer is at a temperature not less than the Curie temperature, a second portion of said readout layer is in the perpendicular magnetization state and a third portion of said readout layer is in the in-plane magnetization state;
   a non-magnetic intermediate layer provided between said recording layer and said readout layer;
   wherein said second portion of said readout layer which is in the perpendicular magnetization state, is magnetically coupled with said recording layer and copies a magnetization of said recording layer;
   wherein said third portion, which is in the in-plane magnetization state, and said first portion, having a temperature not lower than the Curie temperature, do not copy the magnetization of said recording layer; and
   wherein the Curie temperature of said readout layer is lower than the Curie temperature of said recording layer.

7. The magneto-optical recording medium as set forth in claim 6, wherein the Curie temperature of said readout layer is within a range of from 150° C. to 250° C.

8. The magneto-optical recording medium as set forth in claim 6, wherein said readout layer is made of an alloy represented by $(Gd_{X1}Fe_{1-X1})_{Y1}Al_{1-Y1}$ where X1 and Y1 satisfy conditions $0.28 \leq X1 \leq 0.23$, and $0.70 \leq Y1 \leq 1.00$.

9. The magneto-optical recording medium as set forth in claim 6, further comprising an in-plane magnetization layer having a Curie temperature lower than the Curie temperature of said readout layer, for emphasizing the in-plane magnetization state of said readout layer at temperatures not higher than the Curie temperature, said in-plane magnetization layer being provided in contact with said readout layer.

10. The magneto-optical recording medium as set forth in claim 9, wherein the Curie temperature of said in-plane magnetization layer is within a range of from 60° C. to 180° C.

11. The magneto-optical recording medium as set forth in claim 9, wherein said in-plane magnetization layer is made of an alloy represented by $(Gd_{X2}Fe_{1-X2})_{Y2}Al_{1-Y2}$ where X2 satisfies one of conditions $0 \leq X2 \leq 0.18$ or $0.33 \leq X2 \leq 1.00$, and Y2 satisfies condition $0.30 \leq Y2 \leq 0.90$.

12. A magneto-optical recording medium comprising:
  a recording layer made of a perpendicular magnetization film;
  a readout layer made of a magnetic film which is in a perpendicular magnetization state between room temperature and a Curie temperature thereof, where the Curie temperature is set so when a light beam is projected onto said medium, a first portion of said readout layer is at a temperature not less than the Curie temperature, and a second portion of said readout layer is in the perpendicular magnetization state;
  a non-magnetic intermediate layer provided between said recording layer and said readout layer;
  wherein said second portion of said readout layer, which is in the perpendicular magnetization state, is magnetically coupled with said recording layer and copies a magnetization of said recording layer;
  wherein said first portion, having a temperature not lower than the Curie temperature, does not copy the magnetization of said recording layer; and
  wherein the Curie temperature of said readout layer is lower than the Curie temperature of said recording layer.

13. The magneto-optical recording medium as set forth in claim 12, wherein the Curie temperature of said readout layer is within a range of from 150° C. to 250° C.

14. The magneto-optical recording medium as set forth in claim 12, wherein said readout layer is made of an alloy represented by $(Gd_{X1}Fe_{1-X1})_{Y1}Al_{1-Y1}$ where X1 and Y1 satisfy conditions $0.28 \leq X1 \leq 0.32$, and $0.70 \leq Y1 \leq 1.00$.

15. The magneto-optical recording medium as set forth in claim 12, further comprising an in-plane magnetization layer having a Curie temperature lower than the Curie temperature of said readout layer, for emphasizing the in-plane magnetization state of said readout layer at temperatures not higher than the Curie temperature, said in-plane magnetization layer being provided in contact with said readout layer.

16. The magneto-optical recording medium as set forth in claim 15, wherein the Curie temperature of said in-plane magnetization layer is within a range of from 60° C. to 180° C.

17. The magneto-optical recording medium as set forth in claim 15, wherein said in-plane magnetization layer is made of an alloy represented by $(Gd_{X2}Fe_{1-X2})_{Y2}Al_{1-Y2}$ where X2 satisfies one of conditions $0 \leq X2 \leq 0.18$ or $0.33 \leq X2 \leq 1.00$, and Y2 satisfies condition $0.30 \leq Y2 \leq 0.90$.

18. A magneto-optical recording medium including a readout layer which is in an in-plane magnetization state at room temperature and changes into a perpendicular magnetization state at temperatures not lower than a critical temperature, a recording layer made of a perpendicular magnetization film which is magnetically coupled with said readout layer, and an in-plane magnetization layer having a Curie temperature lower than the Curie temperature of said readout layer, for emphasizing the in-plane magnetization state of said readout layer at temperatures not higher than the Curie temperature, said in-plane magnetization layer being provided in contact with said readout layer, said magneto-optical recording medium allowing reproduction of information recorded on said recording layer by application of a light beam to said readout layer,
  wherein said readout layer is heated to at least a temperature in the vicinity of a Curie temperature of said readout layer by the application of said light beam during reproduction, and
  wherein said in-plane magnetization layer is made of an alloy represented by $(Gd_{X2}Fe_{1-X2})_{Y2}Al_{1-Y2}$ where X2 satisfies one of conditions $0 \leq X2 \leq 0.18$ or $0.33 \leq X2 \leq 1.00$, and Y2 satisfies condition $0.30 \leq Y2 \leq 0.90$.

19. The magneto-optical recording medium as set forth in claim 18, wherein the Curie temperature of said readout layer is within a range of from 150° C. to 250° C.

20. The magneto-optical recording medium as set forth in claim 18, wherein the Curie temperature of said in-plane magnetization layer is within a range of from 60° C. top 180° C.

* * * * *